(12) United States Patent
Dickens et al.

(10) Patent No.: US 10,521,004 B2
(45) Date of Patent: *Dec. 31, 2019

(54) REMOTE POWER DOWN CONTROL OF A DEVICE

(71) Applicant: INTERNATIONAL BUSINESS MACHINES CORPORATION, Armonk, NY (US)

(72) Inventors: Louie A. Dickens, Tucson, AZ (US); Timothy A. Johnson, Tucson, AZ (US); Craig A. Klein, Tucson, AZ (US); Gregg S. Lucas, Tucson, AZ (US); Daniel J. Winarski, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 78 days.

This patent is subject to a terminal disclaimer.

(21) Appl. No.: 15/802,664

(22) Filed: Nov. 3, 2017

(65) Prior Publication Data

US 2018/0052510 A1 Feb. 22, 2018

Related U.S. Application Data

(63) Continuation of application No. 15/427,621, filed on Feb. 8, 2017, now Pat. No. 9,851,778, which is a
(Continued)

(51) Int. Cl.
*G06F 1/32* (2019.01)
*G06F 1/28* (2006.01)
*G06F 9/44* (2018.01)
*G06F 1/3287* (2019.01)
*G06F 1/3209* (2019.01)
*G06F 1/3228* (2019.01)
(Continued)

(52) U.S. Cl.
CPC .............. *G06F 1/3287* (2013.01); *G06F 1/28* (2013.01); *G06F 1/3209* (2013.01); *G06F 1/3228* (2013.01); *G06F 1/3234* (2013.01); *G06F 1/3268* (2013.01); *G06F 9/442* (2013.01); *G06F 1/3203* (2013.01); *G06F 1/3215* (2013.01); *Y02D 10/154* (2018.01)

(58) Field of Classification Search
CPC .... G06F 1/3206; G06F 1/3209; G06F 1/3228; G06F 1/3287; G06F 1/3215
USPC .................. 713/300, 310, 320, 330; 709/224
See application file for complete search history.

(56) References Cited

U.S. PATENT DOCUMENTS 5,535,400 A 7/1996 Belmont
5,652,892 A 7/1997 Ugajin
(Continued)

FOREIGN PATENT DOCUMENTS

GB 2349722 A 11/2000
JP 63150715 6/1988
JP 2000293272 10/2000

*Primary Examiner* — Michael J Brown
(74) *Attorney, Agent, or Firm* — Griffiths & Seaton PLLC (57) ABSTRACT

In remote power down control of a device configured for externally initiated remote power down, such as over a network, all externally connected sources of valid power down requests for the device is monitored; and the device is powered down in response to a combination of either of a received power down request and a time out with respect to each of the sources of valid power down requests for the device.

22 Claims, 9 Drawing Sheets

Related U.S. Application Data continuation of application No. 15/161,595, filed on May 23, 2016, now Pat. No. 9,632,799, which is a continuation of application No. 14/812,174, filed on Jul. 29, 2015, now Pat. No. 9,383,810, which is a continuation of application No. 14/470,040, filed on Aug. 27, 2014, now Pat. No. 9,146,612, which is a continuation of application No. 12/573,039, filed on Oct. 2, 2009, now Pat. No. 8,856,563.

(51) Int. Cl.
*G06F 1/3234* (2019.01)
*G06F 9/4401* (2018.01)
*G06F 1/26* (2006.01)
*G06F 1/3215* (2019.01)
*G06F 1/3203* (2019.01)

(56) References Cited

U.S. PATENT DOCUMENTS

| | | | |
|---|---|---|---|
| 5,696,499 | A | 12/1997 | Mitsuhashi et al. |
| 6,509,975 | B1 | 1/2003 | Motegi |
| 6,657,534 | B1 | 12/2003 | Beer et al. |
| 8,856,563 | B2 | 10/2014 | Dickens et al. |
| 9,146,612 | B2 | 9/2015 | Dickens et al. |
| 9,383,810 | B2 | 7/2016 | Dickens et al. |
| 9,851,778 | B2 * | 12/2017 | Dickens ................ G06F 1/3209 |
| 2005/0010831 | A1 | 1/2005 | Bashford et al. |
| 2005/0018663 | A1 | 1/2005 | Dropps et al. |
| 2006/0179161 | A1 | 8/2006 | Dubal et al. |
| 2008/0235528 | A1 | 9/2008 | Kim et al. |
| 2009/0132700 | A1 | 5/2009 | Oya et al. |

* cited by examiner

| N_Port Identifier ⟋261 | World Wide Node Name ⟋262 | World Wide Port Name ⟋263 | Power Down Command received ⟋282 | Inactivity Timer popped ⟋297 | Ready to be powered down ⟋299 |
|---|---|---|---|---|---|
| N Port id 910200 | WWNN 1000000056789012 | WWPN 1000000012345678 | No | Yes | Yes |
| N Port id 910300 | WWNN 1000000033445567 | WWPN 1000000033445566 | Yes | No | Yes |
| N Port id 910400 | WWNN 1000000099887767 | WWPN 1000000099887766 | Yes | No | Yes |
| | | | | | |
| | | | | | |
| | | | | | |
| | | | | | |

| Target Port Name | Address | FC4 Type | RPM Capable | RPM Enabled | Device Type | RPM Status | Last Powered On TS | Active Initiator Address |
|---|---|---|---|---|---|---|---|---|
| AAAAAA | 000000 | SCSI | Yes | Yes | DASD | On | 00000000 | 100000 |
| | | | | | | | | 100001 |
| BBBBBB | 000001 | SCSI | Yes | Yes | DASD | Off | 00ABC133 | |
| CCCCCC | 000002 | SBCCS | No | No | | On | 00000000 | |
| DDDDDD | 000003 | SCSI | Yes | Yes | DASD | On | 00000000 | 100001 |
| | | | | | | | | 100003 |
| EEEEEE | 000004 | SCSI | Yes | Yes | Initiator | On | 00000000 | 100000 |
| NNNNNN | 000007 | SCSI | Yes | Yes | Sequential | On | | 100000 |

REMOTE POWER DOWN CONTROL OF A DEVICE

CROSS REFERENCE TO RELATED APPLICATIONS

This Application is a Continuation of U.S. patent application Ser. No. 15/427,621, filed on Feb. 8, 2017, which is a Continuation of U.S. patent application Ser. No. 15/161,595, filed on May 23, 2016, now U.S. Pat. No. 9,632,799, which is a Continuation of U.S. patent application Ser. No. 14/812,174, filed on Jul. 29, 2015, now U.S. Pat. No. 9,383,810, which is a Continuation of U.S. patent application Ser. No. 14/470,040, filed on Aug. 27, 2014, now U.S. Pat. No. 9,146,612, which is a Continuation of U.S. patent application Ser. No. 12/573,039, filed on Oct. 2, 2009, now U.S. Pat. No. 8,856,563, each of which are hereby incorporated herein by reference.

FIELD OF THE INVENTION

This invention relates to devices that are situated remotely from hosts, and more particularly, where the power state of the device may be controlled remotely by the hosts.

BACKGROUND OF THE INVENTION

It is useful to be able to power up and power down devices based upon need, rather than have them powered all of the time. It is known to externally power off a remote device that is functional and communicating, by sending a command that tells it to power off. In a situation involving multiple hosts, such as a network, a challenge comes in powering off devices that are being used by the multiple hosts.

SUMMARY OF THE INVENTION

Methods, servers, devices, networks, and power controls are provided for remote power down control of a device.

In one embodiment, a method for powering down a device configured for externally initiated remote power down, comprises the steps of:

monitoring of all externally connected sources of valid power down requests for the device; and powering down the device in response to a combination of one of a received power down request and a time out with respect to each of the sources of valid power down requests for the device.

In a further embodiment, a received power down request of a source is invalidated by subsequent activity for the device received from the source.

In a still further embodiment, the activity comprises at least one of a power up request and a command with respect to the device.

In another embodiment, the sources of valid power down requests comprise sources logged in with respect to the device.

In a further embodiment, a power down request comprises at least one of a specific power down request and a log off request from the source.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
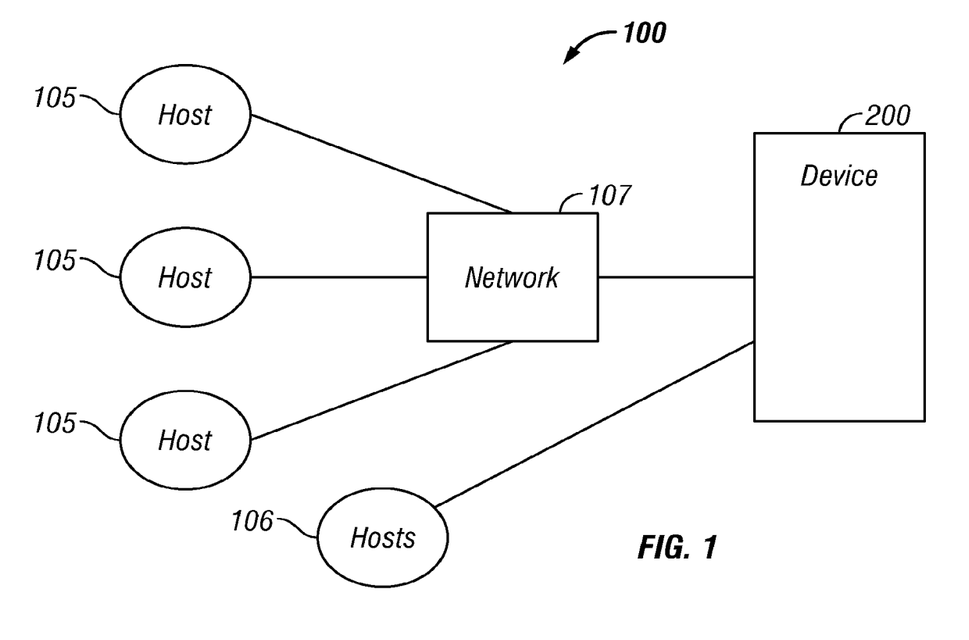
FIG. 1 is a diagrammatic illustration of hosts and of a device which may implement the present invention.

Referring to FIG. 1, an example of a system 100 is illustrated in which hosts 105, 106 provide commands to device 200. An example may comprise a data storage device and the hosts provide commands and data to device 200 for storage and retrieval of the data. The hosts 105 may be connected to the device 200 by means of a network 107, such as through Network Attached Storage (NAS), or a plurality of hosts may comprise partitions or otherwise form a host system 106 that may be directly connected to the device 200. The device 200 may comprise a single entity or may comprise a system subject to being powered down by the hosts.

Many means of implementing communications comprising the direct connection or network communication of FIG. 1 are known to those of skill in the art.

Figure 2:
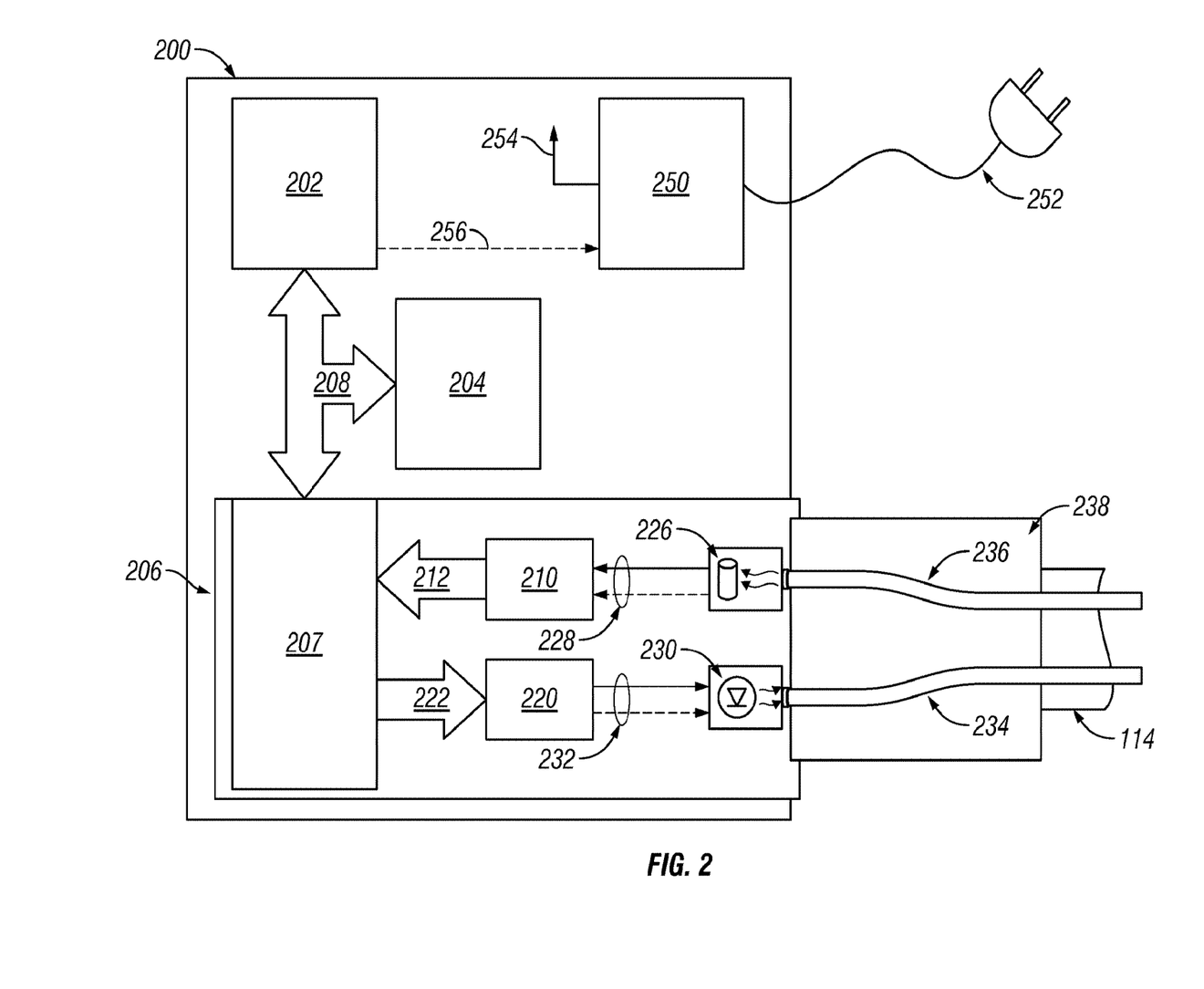
FIG. 2 is a block diagram of an exemplary device of FIG. 1 with an optical serial interface.

FIG. 2 illustrates one example of a communication implementation comprising optical communications to an optically coupled device 200. Device 200 comprises an operational element 202, storage element 204, optical communication port 206, and power supply 250. Operational element 202, storage element 204, and port 206 communicate internally via internal interface 208. Power supply 250 receives power from an external source via cable 252, and converts it to one or more DC voltages 254 to power the various elements of device 200. Operational element 202 comprises any suitable processing device and may comprise associated memory, flash, input/output ports, and support logic, as well as application specific elements. Storage element 204 comprises one or more data storage media, any of which may comprise disk drives, removable data storage, solid state storage devices, sequential storage devices, holographic and other optical devices.

Device 200 communicates with other devices through port 206. Port 206 is connected to an optical cable 114 of one of the connections of FIG. 1 to hosts 105, 106 via connector 238 and comprises optical fibers 234 and 236. Port 206 comprises a high level protocol command processor 207, low level reception and transmission protocol converters 210 and 220, and optical transducer elements 230 and 226 as known to those of skill in the art. Parallel connections 212 and 222 link command processor 207 with converters 210 and 220 respectively, and may, for example, be one 32-bit word wide, and comprise at least one control signal, allowing the differentiation between data words and control words.

High level command processor 207 sends words to be transmitted via connection 222 to low level transmission protocol converter 220, which encodes them from their native 32-bit hexadecimal value to an encoded 40-bit value, using an 8-bit/10-bit encoding scheme known in the art. The encoding scheme is designed to provide a minimal number of transitions between high and low states, and to maintain DC balance when encoded data is sent over serial interfaces. Serial encoded words are then transmitted via differential electrical signals 232 to optical transmitter element 230, which converts the electrical signals to optical signals and transmits the optical signal into fiber 234.

Optical signals from fiber 236 are received by optical receiver element 226 and converted to differential electrical signals 228 to low level reception converter 210, which receives the serial information, detects the delimiters and converts the serial information into 40-bit words, detects the data and control words, and decodes the 40-bit words to their native 32-bit hexadecimal values. The decoded words are then received by high level command processor 207 via parallel connection 212, along with indications of control words via control signals.

It is useful to be able to power up and power down devices based upon need, rather than have them powered all of the time. It is known to remotely power off a device that is functional and communicating, by sending a command that tells it to power down. A powered down state may comprise any situation of reduced power or power off to elements of the device, and a powered on state may comprise any situation of fully or partially operational powered on elements of the device. "Remote" means that the device being powered up or powered down is connected to the host via a communication link. The "remote" device may or may not be in the immediate vicinity of the host.

A challenge comes in powering off devices 200 that are being used by multiple hosts 105, for example, on the network. Typically, a user will operate a host to power down an unused device to save energy, but another host on the network will still be using the device and will instead want the device to be powered up. The delay introduced by powering up a powered down device may prove undesirable by the second host.

Referring to FIGS. 1, 2, 3 and 4, in one embodiment, the device 200 is configured for an externally initiated remote power down by any of hosts 105 or of host 106. In one embodiment, a method is provided for powering down the device 200, comprising monitoring the activity of all the externally connected sources 105, 106 of valid power down requests for the device 200; and powering down the device in response to a combination of either a received power down request or an inactivity time out with respect to each of the sources 105, 106 of valid power down requests for the device. In one example, the device is coupled to the hosts 105, 106 via at least one optical communication link, such as Fibre Channel. In an existing Fibre Channel SCSI protocol, each host may serve as an initiator, and an initiator is considered a "source" only if the initiator is currently logged in (in Fibre Channel terminology, short for completed port login and process login), for example, at port 206 and high level protocol command processor 207, in step 258 of FIG. 4. Initiators, for example, get to the login-complete state by issuing a port login extended link service that is accepted by the target, and also a process login extended link service that gets accepted by the target as well.

In one embodiment, the method is controlled by the operational element 202 of the device, and may utilize the storage element 204, if any, and selectively operate the power supply 250 via link 256.

Figure 3:
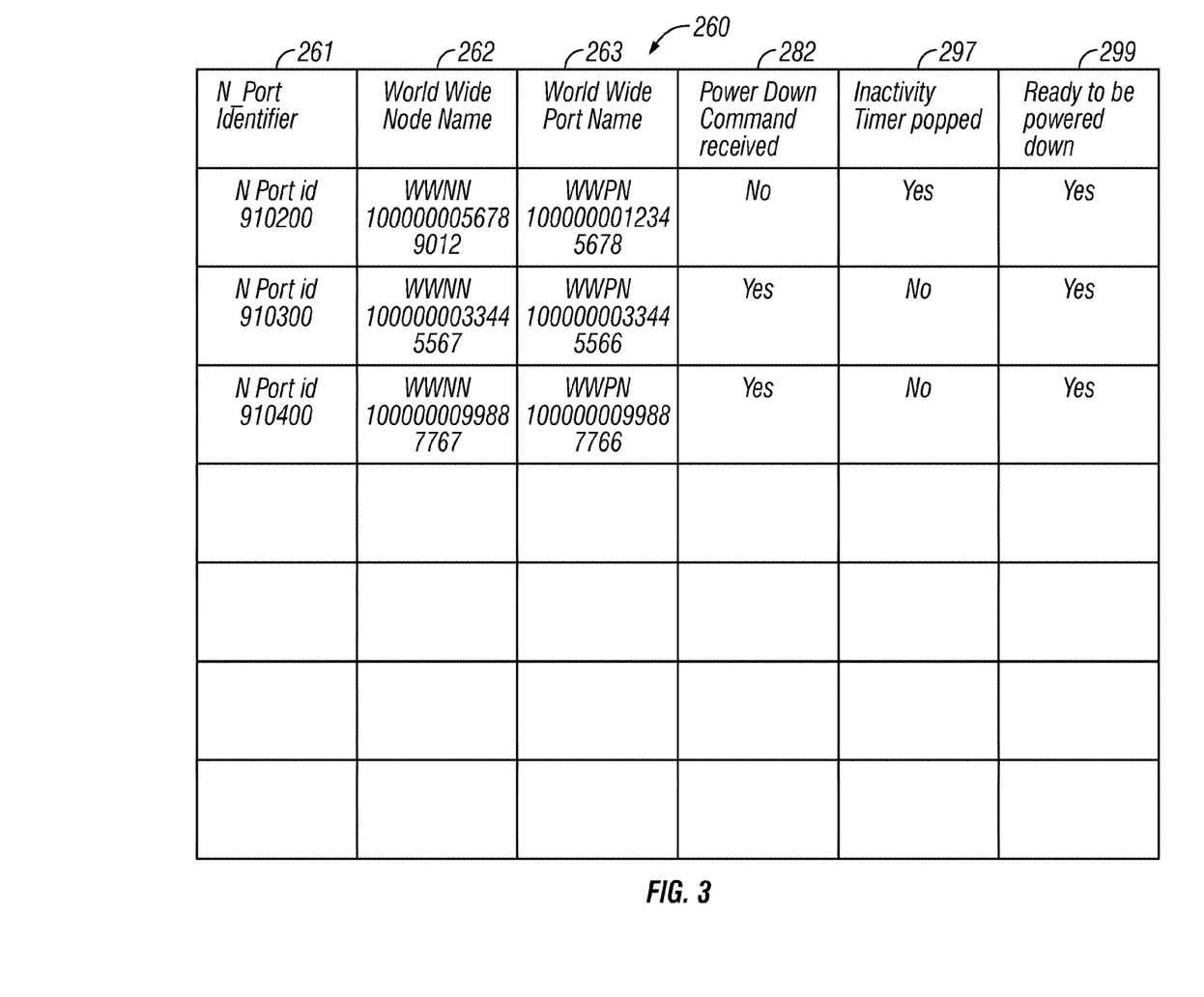
FIG. 3 is a diagrammatic illustration depicting a table maintained by the device of FIG. 1.
Figure 4:
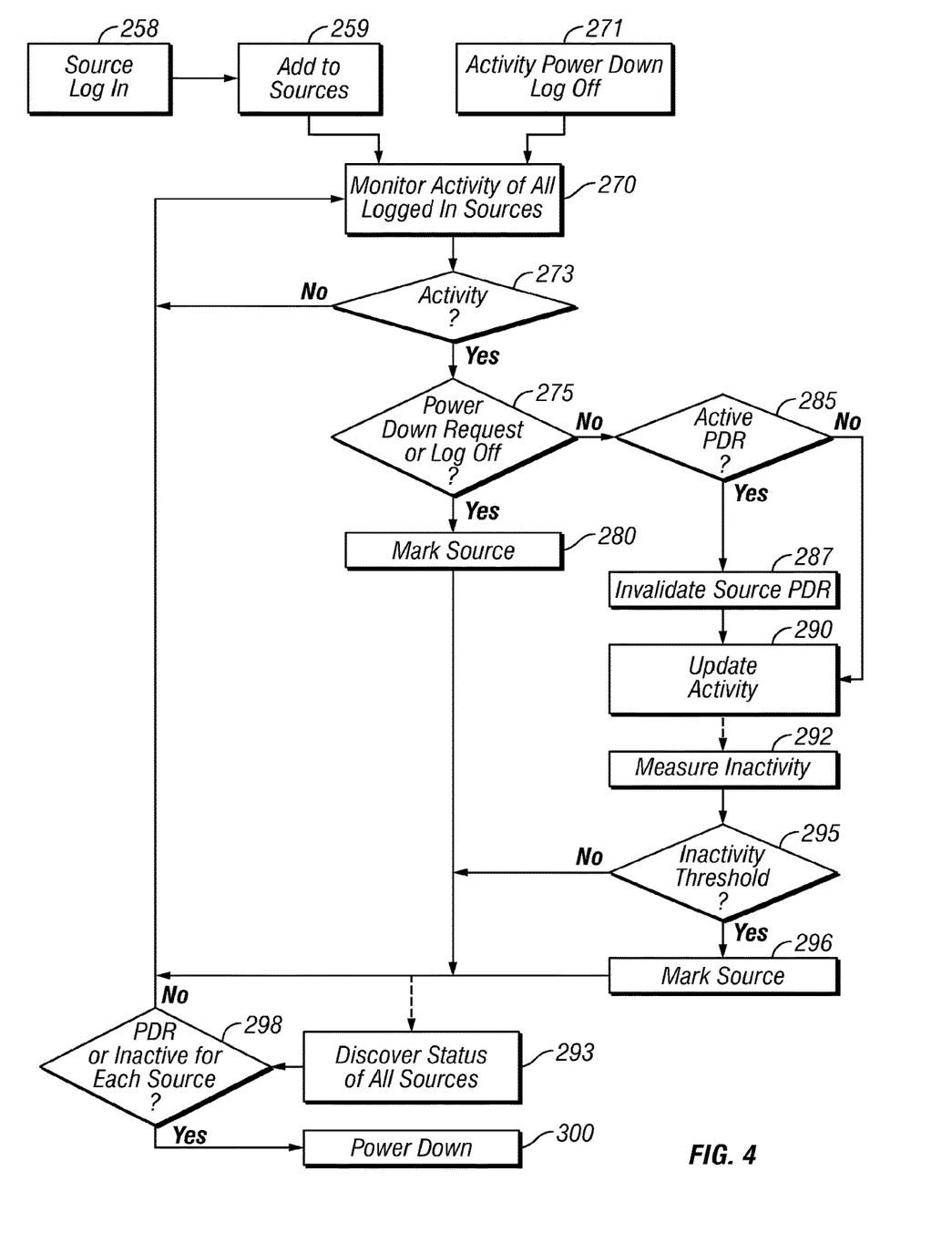
FIG. 4 is a flow chart depicting an exemplary method of operating the device of FIG. 1.

The process login acceptance may be conducted by the operational element 202, and, in step 259, the accepted initiator is added to the list of sources, for example, in table 260 of FIG. 3, where the sources (initiators) are identified by their node port names 261, world wide node names 262, and world wide port names 263. Table 260 represents information stored, for example, by the operational element 202 which may or may not be in the form of an actual table.

In step 270, the logged in sources 105, 106 are monitored for activity, and monitored for power down or log off commands 271. In one example, activity comprises the sending or receiving of Fibre Channel frames, but Fibre Channel primitives do not count as activity. In another example, the activity comprises either a command or a power up request with respect to the device. The power up request may be considered activity because a power down request from the same initiator that may have preceded it may not have resulted in an actual power down.

In step 273, if there is no activity, the monitoring continues for the source in step 270. If there is activity, step 275 detects whether the input is a power down request or a log off command, and, if so, in step 280, the source is marked in column 282 of table 260. The power down request and log off command are considered to both indicate that the host is releasing the device.

If step 280 indicates that the input is not a power down request or log off command, step 285 determines whether column 282 had previously been marked to identify a power down request from the source. The activity identified in step 273 invalidates any previous power down request in that the source apparently considers the device to be powered up and active, and the previous power down request in column 282 is reset in step 287.

In step 290, the activity identified in step 273 updates the activity monitoring for the source.

Inactivity with respect to the source is measured in step 292 continuously, periodically, or randomly, and the measurement is taken individually or as a part of the status discovery process of step 293, as will be discussed. Inactivity measurement may comprise any of various measurements, such as a less than minimum amount of activity measured over a given time period, or as a lack of any activity in a given time period, for example, as measured by a timer. In one embodiment, inactivity comprises the timing out of a timer that had been reset at the last activity by the source. In one example, the time period comprises a 10 minute period. In another embodiment, inactivity comprises only one instance of activity in a 15 minute period together with a 10 minute time period without any activity.

If, in step 295, the inactivity threshold is not met, the process returns to step 270 to continue monitoring.

If the inactivity threshold of step 295 is met, step 296 marks the source in column 297 of table 260.

Step 293 discovers the power down and inactivity status of all the logged in sources. Step 293 may be conducted continuously, periodically, or randomly, and may initiate the individual inactivity measurement of each of the sources of step 293.

Step 298 is illustrated in column 299 of table 260 and comprises the "OR" function of the power down request (or log off) of column 282 and the inactivity measurement of column 297. Column 299 is for the purpose of illustration only and need not be specifically identified. If all of the logged in sources have either or both the power down request (or log off) of column 282 and the inactivity measurement of column 297 marked, step 300 powers off the power supply 250 of device 200. Otherwise, the monitoring activity continues in step 270.

Thus, where multiple hosts are logged in and are sources of power down requests for device 200, the power down control, for example, of the operational element 202, provides the actual power down of the device, so that a user that operates a host to power down an unused device, will not adversely affect another host that is still using the device. The second host will not have to power up a powered down device.

Figure 5:
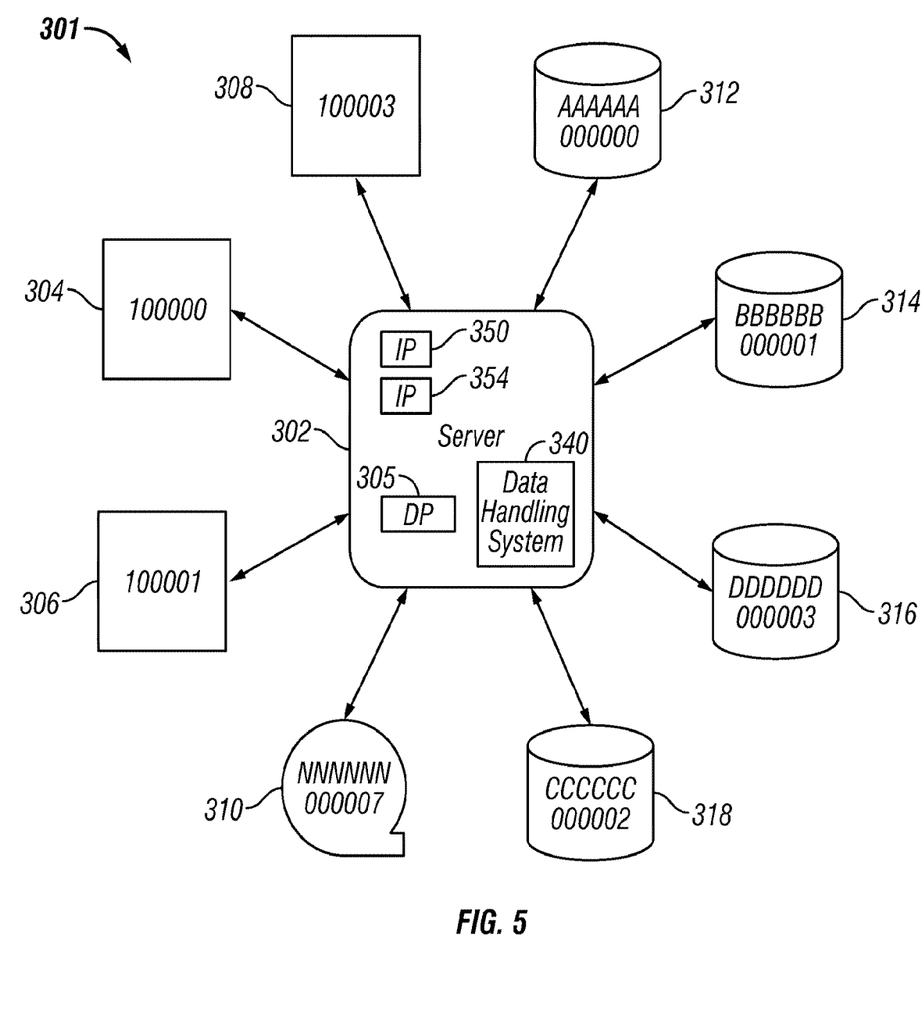
FIG. 5 is diagrammatic illustration of a network and server which may implement the present invention.

FIG. 5 illustrates a server 302 configured to power down target devices 310, 312, 314, 316, and/or 318 arranged in a network 301 in accordance with an embodiment of the invention. In one example, initiator ports 350, 354 are configured to provide communication over the network to multiple devices or initiators 304, 306, and/or 308 that are potential sources of a power down for the devices. Device ports 305 are configured to provide communication over the network to the devices to be powered down. The server comprises at least one data handling system 340. Alternatively, the server may comprise a processor within a switch, which controls the network 301.

Figure 6:
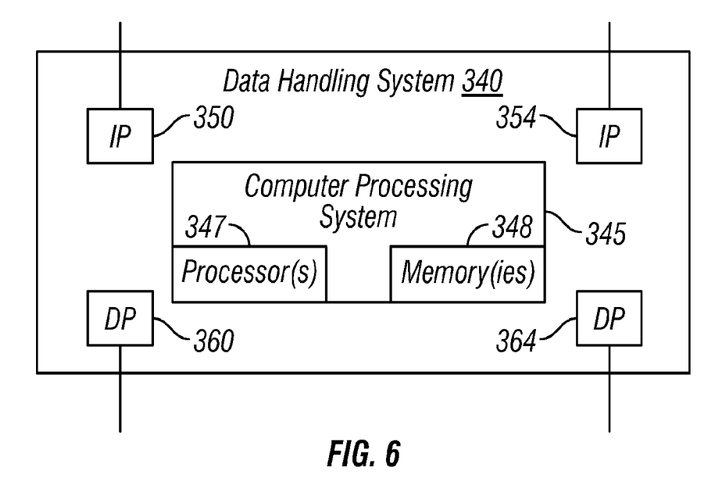
FIG. 6 is a block diagram of the server and computer processing system of FIG. 5.

FIG. 6 illustrates an example of a data handling system 340 which may implement the present invention and may implement the function of the server 302. Alternatively, the data handling system 340 may also control the switching function. Still alternatively, the switch function may be carried out by one entity and the server function is conducted separately. Referring to FIG. 6, the data handling system 340 comprises a computer processor system 345 configured to operate the server, the computer processor system having computer processor(s) 347, and memory(ies) 348 configured to store information and computer readable program information for operating the computer processor(s). Herein, referring to both data handling system 340 and the processor for operational element 202 of the device 200 of FIGS. 1 and 2, "computer processor", "computer processing system" or "control" may comprise any suitable logic, programmable logic, microprocessor, and associated or internal memory for responding to program instructions, and the associated or internal memory may comprise fixed or rewritable memory or data storage devices. The program information may be supplied to the subsystem control or memory from a host or via a data storage drive or disk array, or by an input from a floppy or optical disk, or by being read from a cartridge, or by a web user interface or other network connection, or by any other suitable means. The program information thus may comprise one or more program products comprising a computer useable storage medium having computer usable program code stored therein for operating the data handling system 340, or similar types of systems or devices.

Initiator ports 350, 354 may comprise one or more host adapters, Fibre Channel ports, one or more FICON ports, one or more ESCON ports, one or more SCSI ports, or other suitable ports. Each host interface is configured to communicate with a host system of network 301 of FIG. 5 such that the server can handle I/O from any host or using entity. In one example, the initiator ports 350, 354 connect to an Ethernet based network 301 via standard TCP/IP protocols.

Device ports 305 may comprise device adapters, for example for serial interconnections, such as RS-232 or RS-422, Ethernet connections, SCSI interconnections, ESCON interconnections, FICON interconnections, or connections to a Local Area Network (LAN), a private Wide Area Network (WAN), a public wide area network, Storage Area Network (SAN), Transmission Control Protocol/Internet Protocol (TCP/IP), the Internet, and combinations thereof.

An example of a data handling system 340 or server 302 comprises an IBM® Enterprise Storage Server, IBM® Model DS 8000, or other comparable system.

Figure 7:
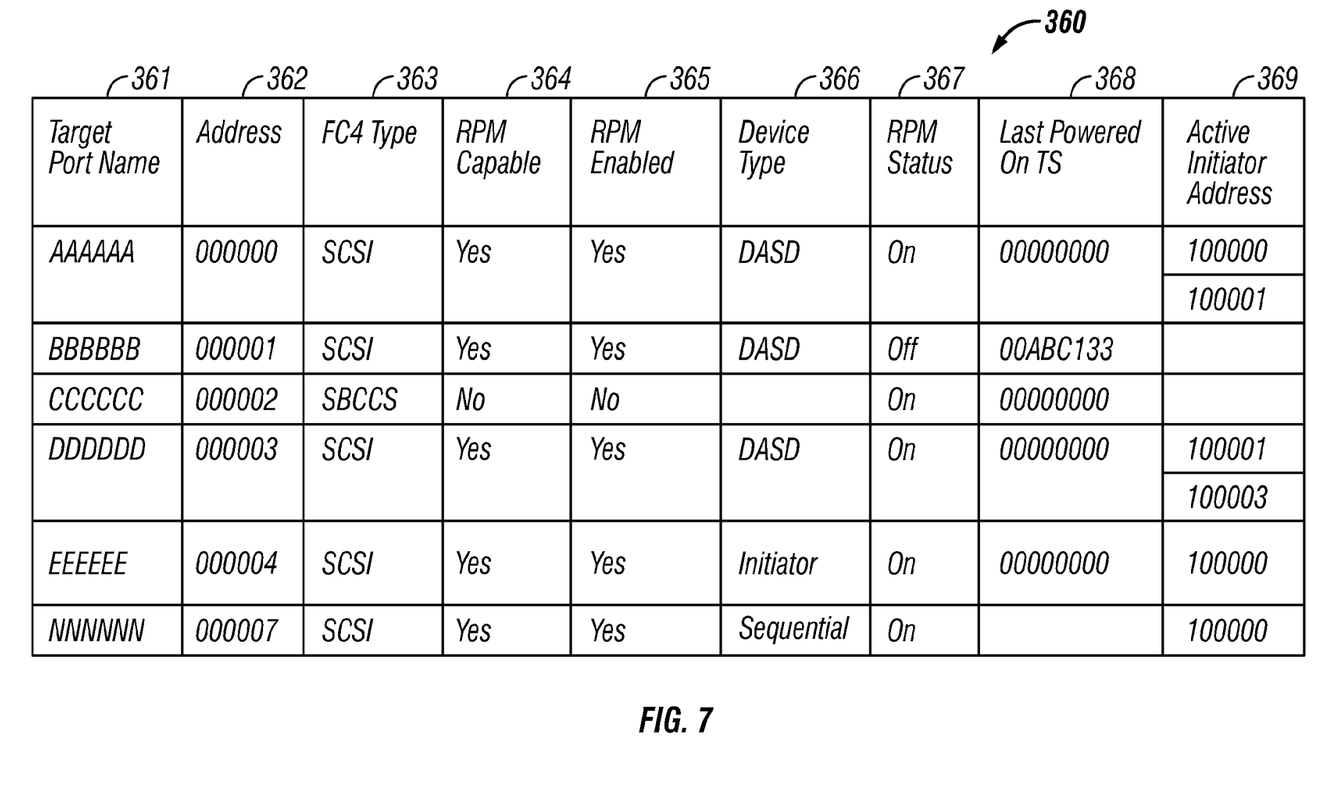
FIG. 7 is a diagrammatic illustration depicting a table maintained by the server of FIG. 5.

Referring to FIGS. 5 and 7, FIG. 7 depicts a remote power management table 360 maintained by the server 302 of FIG. 5 to manage the power state of each of respective target devices. The table 360 represents information stored, for example, by the data handling system 340 which may or may not be in the form of an actual table. Column 361 is the port name of a respective target device 310, 312, 314, 316, and/or 318. Column 362 contains the address of the respective device, and column 363 gives the type of connection for the device. Column 364 indicates whether the respective device is configured to power down in response to a power down command by the server 302, making it capable of "remote power management" (RPM), and column 365 indicates whether that capability is enabled. Column 366 indicates the type of device. Column 367 indicates the RPM status, either currently powered on or powered off, and column 368 contains a time stamp (TS) of the last time the device was powered on, if it is currently powered off. If the device is currently powered on, this field is zero. Column 369 contains a list of the addresses of all initiators that are currently accessing the device, and are "sources". The initiators of column 369 are also only those sources that are currently active, and not inactive.

Figure 8:
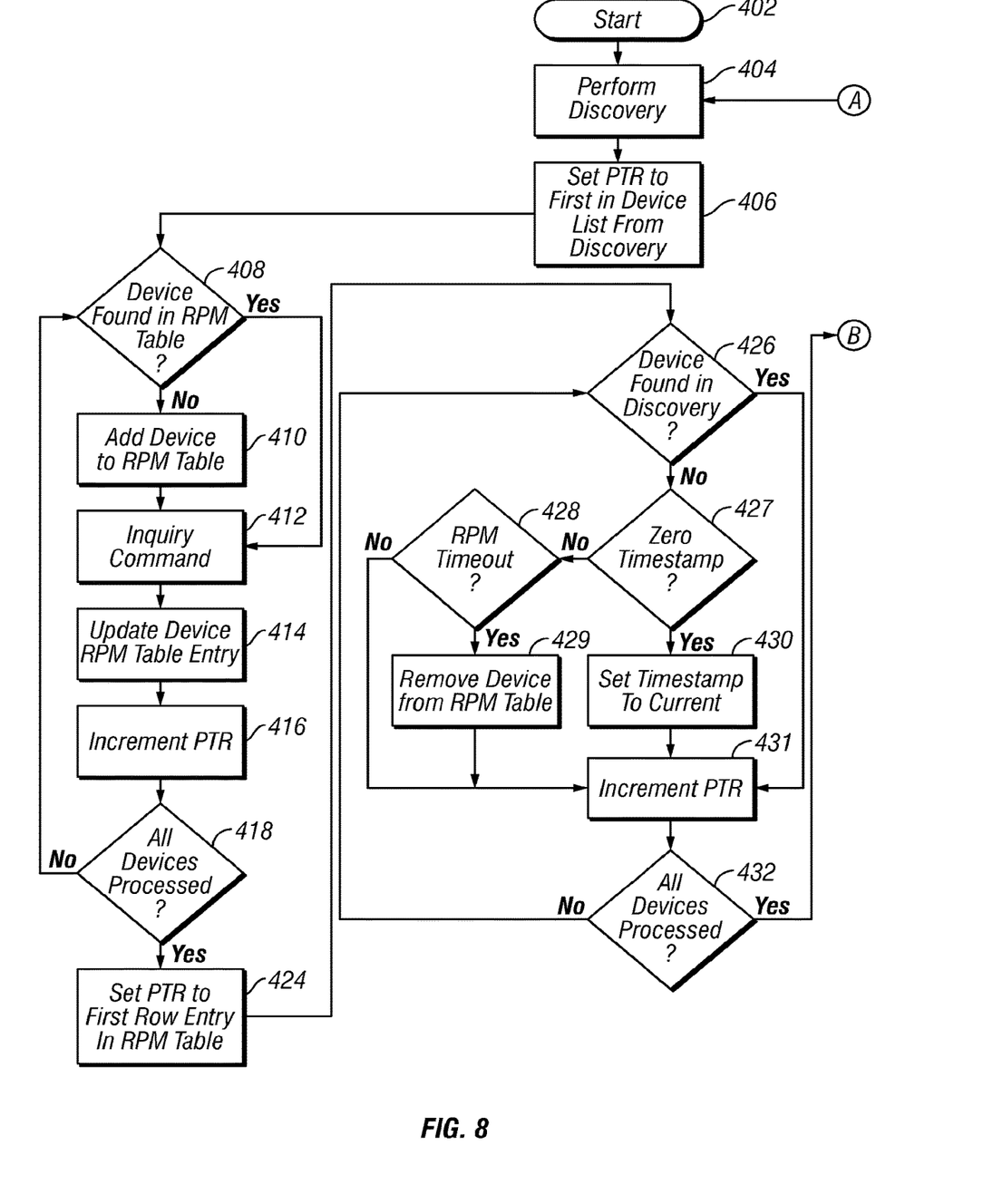
FIG. 8 is a flow chart depicting an exemplary method of operating the system of FIG. 5.

Referring to FIGS. 5, 7 and 8, an embodiment of the remote power management begins at step 402, and, in step 404, performs device discovery to identify the initiator and target devices for table 360. In step 406, a pointer (PTR) is set to the first device in the list of devices from the discovery process. For that device, step 408 checks for the current device in the table 360. If the device is not found, step 410 adds a row to the table 360 for the new device. For the new device found in step 408 or the device already listed in the table 360 as determined by step 408, step 412 sends an inquiry command, such as a FCP-SCSI (Fibre channel protocol) Inquiry, to determine the device characteristics in order to populate the rest of the new table entry. Step 414 fills out or updates the rest of the table entry with the device data returned from the inquiry command. In one embodiment, step 414 also clears column 369, the active "source" initiators for the device, to all blanks. Step 414 also clears and sets to all "0" the column 368, last powered on time stamp, for the device. Step 416 increments the pointer and then in step 418 checks whether all devices of the network have been processed. If all devices have not been processed, the process returns to step 408.

If step 408 indicates that all discovered devices have been processed and their entries created or updated, step 424 sets the pointer to the first device row in the table 360. If the device had not been found in discovery of step 426, steps 427 and 428 ascertain its status. Step 427 checks the last powered on time stamp in column 368 of table 360. If the time stamp of step 427 is zero, the device was powered up during a previous discovery process, so in step 430, the last powered on time stamp in column 368 is set to the current time. If in step 427, it was determined that the last powered on time stamp was not zero, the process continues at step 428, where it checks, for example, for a timeout, indicating that the device has become inactive. As discussed above, a timeout is one means of indicating that a device has become inactive, and another means is to determine whether the activity in a time period has fallen below a threshold.

If the timeout has occurred, step 429 removes the device entry from the table 360 as will be discussed. If the device was an initiator, step 429 also clears the active initiator address of the device from column 369 for any device for which it had been a source. Thus, column 369 for a target device that may be remotely powered down indicates only those initiators that are a source and are not timed out.

A "No" result from step 428, or a completion of step 429, or a completion of step 430, or step 426 indicating that the current device was found during the discovery process, leads to step 431 which increments the pointer to the next device row in the table 360. Step 432 determines whether all of the devices in the table 360 have been processed. If not, the process returns to step 426 to process the next entry.

If all the devices have been processed, step 434 checks for an active RPM request, which may comprise a power down request or a power up request. If no RPM request is detected, step 468 detects whether a state change notification (SCN) has been received regarding any of the active devices. A state change notification, such as a log off command, requires that the table 360 be updated, so the process returns to step 404 to perform discovery. If there is no state change notification, step 434 is repeated.

If step 434 indicates that the server 302 has received a command requesting the RPM state of a device be set, such as a power down request, the process flows to step 436 to check whether the device is in the table 360. If not, an error is returned in step 442 with a sense key indicating that the device was not found, and the process returns to step 468.

If the device is found in the table, step 438 checks the table to determine whether the respective device is RPM capable (column 364) and whether the RPM is enabled (column 365). If step 444 indicates that the RPM request is a power down request, step 454 uses column 369 of the table 360 to determine whether any other initiator is active and using the respective device, a "source" that has not timed out. If step 454 indicates no other initiators are active sources for the device, step 458 sends the requested power down command to the target device via port 305.

If other initiators are active and using the device, a "source" for the device, step 456 determines whether all the other sources are timed out and are inactive with respect to the device, or have issued a power down request for the device. In one embodiment, step 456 checks whether the devices listed in column 369 are still found in the directory of the server or of the switch (called a directory name server). If the initiators were powered off or malfunctioned and are no longer operating, they will time out with the directory name server, and will be removed from the name server list. If all of the initiators found in the table, other than the initiator requesting that the device be powered down, are no longer in the directory name server, step 458 sends the requested power down command to the target device via port 305. If in step 256, any of the other initiators in column 369 for the device are still found in the name server, step 449 updates the initiator status, removing the initiator requesting the device be powered down from column 369 for the device. Any initiators that were not found in the directory name server that are listed in column 369 for the device are also removed.

Thus, the removal of the initiators accomplishes the function of indicating either that they have become inactive or that they have requested a power down of the device, fulfilling the "OR" function for those initiators. As the result, the absence of other sources from column 369 indicates that the "OR" function of the power down request (or log off) and the inactivity measurement are complete for those initiators for the device, and, if completed, step 454 would have been a "No" and step 458 would have sent the requested power down request.

If step 456 determines that at least one other source remains active and has not issued a power down request for the device, for example, by remaining in column 369 for the device, the device is not powered down. Step 449 is completed as discussed above, and the process returns good status with respect to the power down request in step 464.

If step 458 sent the requested power down command, step 460 checks the status returned by the device. If the command to the device was successful (the device indicating good status indicating it is powering down), the process updates the device status in column 367 of table 360. Also in step 462, if the requested command was a power down command, the process saves the current time stamp in column 368 for the device and removes all initiator addresses (if there are any remaining) from column 369. If the command requested was a power up command, to be described subsequently, the process adds the initiator address to column 369, and sets the time stamp in column 368 to zero. The process returns good status to the initiator in step 464, and moves to step 468. If step 460 was not successful, the process returns a check condition to the initiator in step 466 with status indicating that the command failed, and then moves to step 468.

If in step 444, it is determined that the initiator is requesting that the device be powered up, the process continues at step 446 to check whether the initiator is listed in column 369 for the device. If it is not, step 452 adds the initiator's address to the list of initiators that are using the device in column 369. If in step 446, the initiator is already listed, or upon completion of step 452, the process flows to step 458 and the power up command is sent to the device.

Thus, the server 302 monitors, via the initiator ports 350, 354, activity of network connected sources 304, 306, 308 of valid power down requests for each of several devices 310, 312, 314, 316, 318; and provides a power down command to a device, via device ports 305, in response to a combination of either received power down request or an inactivity time out with respect to each of the sources of valid power down requests for that device.

Referring to FIGS. 2 and 6, the implementations may involve software, firmware, micro-code, hardware and/or any combination thereof. The implementation may take the form of code or logic implemented in a medium, such as memory 348, storage element 204, and/or circuitry 202 or 347 where the medium may comprise hardware logic (e.g. an integrated circuit chip, Programmable Gate Array [PGA], Application Specific Integrated Circuit [ASIC], or other circuit, logic or device), or a computer readable storage medium, such as a magnetic storage medium (e.g. an electronic, magnetic, optical, electromagnetic, infrared, or semiconductor system, semiconductor or solid state memory, magnetic tape, a removable computer diskette, and random access memory [RAM], a read-only memory [ROM], a solid state disk drive [SSD], a rigid magnetic disk and an optical disk, compact disk-read only memory [CD-ROM], compact disk-read/write [CD-R/W], DVD, and BD).

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for powering down a device configured for externally initiated remote power down, each of a plurality of externally connected sources of valid power down requests being logged in for said device, the method comprising the steps of:
   powering down said device in response to one of each of said plurality of externally connected sources and an inactivity time out with respect to one of said plurality of externally connected sources occurring.

2. The method of claim 1, wherein a received power down request of one of said plurality of externally connected sources is invalidated by subsequent activity for said device received from said one of said sources.

3. The method of claim 2, wherein said activity comprises at least one of a power up request and a command with respect to said device.

4. The method of claim 3, wherein said power down request comprises at least one of a specific power down request and a log off request from said one of said sources.

5. A server configured to power down at least one device arranged in a network, each of a plurality of externally connected sources of valid power down requests being logged in for said at least one device, said server comprising:
   at least one device port configured to provide communication over said network to said at least one device;
   at least one initiator port configured to provide communication over said network to at least one network; and
   at least one data handling system configured to:
      power down said at least one device in response to one of each of said monitored of said plurality of externally connected sources and an inactivity time out with respect to one of said plurality of externally connected sources occurring.

6. The server of claim 5, wherein said data handling system is configured to invalidate a received power down request of one of said plurality of externally connected sources in response to subsequent activity for said respective device from said one of said sources.

7. The server of claim 6, wherein said activity comprises at least one of a power up request and a command with respect to said respective device.

8. The server of claim 7, wherein said power down requests comprise at least one of a specific power down request and a log off request from said one of said sources.

9. A device configured to perform at least one function and configured to power down, each of a plurality of externally connected sources of valid power down requests being logged in for said device, said device comprising:
   at least one port configured to provide communication over a network;
   at least one function apparatus to perform said at least one function in response to commands received via said at least one port; and
   at least one control system configured to:
      power down said device in response to one of each of said plurality of externally connected sources and an inactivity time out with respect to one of said plurality of externally connected sources occurring.

10. The device of claim 9, wherein said control system is configured to invalidate a received power down request of a source in response to subsequent activity for said device from said at least one of said plurality of externally connected sources.

11. The device of claim 10, wherein said activity comprises at least one of a power up request and a command with respect to said device.

12. The device of claim 11, wherein said sources of valid power down requests comprise sources logged in, via said at least one port, with respect to said device.

13. The device of claim 11, wherein said power down request comprises at least one of a specific power down request and a log off request from said source.

14. A network, connecting each of a plurality of externally connected sources of valid power down requests for being logged in, the network comprising:
   a communication network; and
   at least one device connected to said communication network, said at least one device configured to:
      power down said device in response to one of each of said plurality of externally connected sources and an inactivity time out with respect to one of said plurality of externally connected sources occurring.

15. The network of claim 14, wherein said at least one device is configured to invalidate a received power down request of one of said plurality of externally connected sources in response to subsequent activity for said device from said one of said plurality of sources.

16. The network of claim 15, wherein said activity comprises at least one of a power up request and a command with respect to said device.

17. The network of claim 16, wherein said power down request comprises at least one of a specific power down request and a log off request from said source.

18. A power control for a network attached device, using a plurality of logged in externally connected sources of valid power down requests for said network attached device, the power control comprising:
   an input configured to detect commands received by said network attached device from said network; and
   at least one control system configured to:
      power down said network attached device in response to one of each of said plurality of externally connected sources and an inactivity time out with respect to one of said plurality of externally connected sources occurring.

19. The power control of claim 18, wherein said at least one control system is configured to invalidate a received power down request of a source in response to subsequent activity for said network attached device from at least one of said plurality of externally connected sources.

20. The power control of claim 19, wherein said activity comprises at least one of a power up request and a command with respect to said network attached device.

21. The power control of claim 20, wherein said sources of valid power down requests comprise sources logged in with respect to said network attached device.

22. The power control of claim 21, wherein said power down request comprises at least one of a specific power down request and a log off request from said at least one of said plurality of externally connected sources.

* * * * *